INVENTOR
Leary W. Smith

BY Watson, Cole, Grindle & Watson
ATTORNEYS

Oct. 20, 1970 L. W. SMITH 3,535,465

ANNOUNCING MACHINE FOR APERIODIC AND PERIODIC INFORMATION

Filed April 8, 1968 5 Sheets-Sheet 2

INVENTOR

Leary W. Smith

BY Watson, Cole, Grindle & Watson

ATTORNEYS

INVENTOR
Leary W. Smith

BY Watson, Cole, Grindle & Watson
ATTORNEYS

Oct. 20, 1970 L. W. SMITH 3,535,465

ANNOUNCING MACHINE FOR APERIODIC AND PERIODIC INFORMATION

Filed April 8, 1968 5 Sheets-Sheet 4

INVENTOR

Leroy W. Smith

BY Watson, Cole, Grindle & Watson

ATTORNEYS

INVENTOR
Leary W. Smith

BY Watson, Cole, Grindle & Watson
ATTORNEYS

1

3,535,465
ANNOUNCING MACHINE FOR APERIODIC AND PERIODIC INFORMATION

Leary W. Smith, Atlanta, Ga., assignor to The Audichron Company, Atlanta, Ga., a corporation of Georgia Filed Apr. 8, 1968, Ser. No. 719,390
Int. Cl. G11b *5/48, 21/12, 25/02*
U.S. Cl. 179—100.1 17 Claims

ABSTRACT OF THE DISCLOSURE

Apparatus is provided for reproducing both aperiodic and periodic recorded information from separate records which are in axial alignment and which have information recorded on their longitudinal axis such that the information may be reproduced from a common reproducing medium with absolute continuity. Apparatus is provided for indexing associated periodic variables and for securing positive alignment of the aperiodic variable records with the reproducing medium. The apparatus includes means for moving the reproducing medium longitudinally across the recordings to provide access to the recorded information for its reproduction during the reproduction cycle.

This invention relates to announcing machines and, more particularly, to magnetic drum type announcing machines for announcing both periodic and aperiodic physical variables.

Numerous types of announcing machines having magnetic drum type reproducing devices have been employed to announce physical variables of a periodic nature. Machines have also been developed for announcing a physical variable of the aperiodic type, such as temperature. However, the problems relevant to machines for announcing aperiodic type variables are separate and distinct from those problems relevant to machines for announcing periodic variables, such as time. For example, in a periodic type announcing machine the reproducing instrument, such as a magnetic head, is commonly moved equal steps which are normally always in a predetermined cyclic direction. In the aperiodic type announcing machine, however, the reproducing instrument must be moved through infinitely variable steps in either of two directions. Furthermore, in the latter type of announcing machines, movement of the reproducing head must be controlled to a sufficient degree of accuracy that only the desired or selected individual record will be reproduced. In such apparatus there must be provisions made for accurately positioning the reproducing mechanism with respect to one of the record tracks even though the physical variable to be announced lies between that recorded on two adjacent tracks. The reproducing instrument must be positioned in a cooperating position with one of the tracks even though the physical variable to be announced lies between the information recorded onto adjacent tracks. The cooperative positioning of the reproducing instrument must be accomplished without the "locking" of the relative movement between the reproducing head and the record supporting device.

In accordance with the teachings of this invention, there is provided a novel announcing machine which is capable of announcing both periodic and aperiodic physical variables such as, for example, audible announcements of time and temperature in hours, minutes and degrees. With variations in design, however, the same principles of operation may be employed in an announcing machine to announce a periodic physical variable such as time only, either in hours and minutes; hours, minutes and seconds; or other units of time such as hours and hundredths of hours. Similarly, with minor modifications, the principles of operations set forth herein may be employed to design a machine for announcing an aperiodic physical variable such as, for example, temperature only, or other variables such as liquid levels in tanks or flows of liquids or gases in pipe lines, etc.

2

Moreover, the announcement capabilities of the apparatus disclosed herein are not limited solely to voice reproduction, but may be adapted to include coded signals for supplying information on demand or automatically to computer systems in the control of processes or other functions.

Accordingly, a primary object of this invention is to provide a machine capable of announcing both aperiodic and periodic physical variables.

Another object of this invention is to provide an announcing machine which reports the magnitude of both an aperiodic and periodic physical variable with a high degree of accuracy and reliability.

It is a further object of this invention to provide an announcing machine that can be readily adapted to the accurate and reliable reporting of either aperiodic physical variables, periodic physical variables, or both aperiodic and periodic physical variables.

Briefly, the apparatus in accordance with the embodiments of the invention disclosed herein, provides a magnetic drum type announcing machine with a magnetic head carriage mechanism which is operatively coupled to an aperiodic variable responsive servo system and to a periodic variable storage recording. The servo mechanism employed is similar to that which is disclosed in McCarty et al. Pat. No. 3,161,729, issued Dec. 15, 1964, for a Temperature Announcing Machine, with the necessary modifications discussed hereinafter. The servo system accurately positions the magnetic drum containing a record of the aperiodic physical variables with respect to the magnetic head supporting carriage as the servo system re-balances itself in response to changes in the aperiodic variable. Advantageously, the magnetic announcing tracks are recorded along the longitudinal axis of the records and sound is reproduced by the movement of the sound head relative to the records. This is in contradistinction to the commonly used practice of moving the recorded medium relative to the sound head. A novel spring drive is incorporated to produce a constant force to impart motion to the magnetic head irrespective of the position in which the head is in relation to the series of drums.

The machine is driven by a synchronous motor through a suitable gear reduction to turn a primary shaft at a constant speed of twelve r.p.m. A drum mounted to the shaft has wound thereon the spring for driving or moving the magnetic carriage head with respect to the record drums. The drum is driven through four-fifths of a revolution and then is released by pin means which disengage a pawl type clutch, which is also mounted to the shaft, from a retaining pin. This enables the spring to return the head carriage assembly to its starting position. A brake shoe is also provided to slow down the head carriage assembly before it strikes a stop.

At the end of the announcement portion of the five second cycle, the lifter cam is actuated to lift the sound head off the surface of the records while the carriage is returning to the starting position at which time the lifter cam is again actuated to lower the head onto the record for the next five second announcement cycle.

A primary ratchet wheel is indexed one time each five seconds by means of a cam mounted to the shaft. This causes the primary ratchet wheel to be rotated one tooth for each revolution of the shaft by means of a ratchet pawl which engages the teeth of the wheel. The primary ratchet wheel is retained during a return movement of the ratchet lever at the end of the five second cycle by semi-circular detents which are machined into a projection on one side of the wheel and are engaged by spring loaded balls.

A minute ratchet wheel is mounted adjacent to the primary ratchet wheel and is controlled by a five-lobed cam that is attached to the primary ratchet wheel and which activates an index ratchet pawl in contact with the minute ratchet wheel. The minute ratchet pawl includes a projecion which acts as a cam follower and contacts the cam projection of the primary ratchet wheel allowing the minute ratchet pawl to engage the minute ratchet wheel each twelfth index of the primary ratchet wheel. The minute ratchet wheel is also detented by means of spring loaded balls in the same manner as the primary ratchet wheel. The minute ratchet wheel is secured to a tubular minute shaft.

The minute record hub is mounted on the outer end of the tubular minute shaft and in addition to functioning as a hub for holding the minute record, it also serves as a member of the hour index mechanism. A slot is machined axially in the periphery of the minute record hub to accommodate an outer index pawl. The pawl is spring loaded to cause one end to ride the periphery of a single lobe hour index cam which is mounted to a stationary outer support member. At each fifty-ninth index of the minute record the hour index pawl is deflected by the cam lobe to cause its opposite end to enter between two teeth of sixty teeth machined in the periphery of a flange on the hour hub. On the sixtieth index of the minute record the hour record hub and record is indexed one-sixtieth of a revolution. In the succeeding minute index the pawl moves off the cam lobe and disengages the teeth of the hour record hub flange. Detents machined in a recess of the hour record hub are engaged by spring loaded balls to retain the index position of the hour record assembly between indexes. The engagement of the hour index pawl with the teeth of the hour flange is adjustable by means of a ball-pointed screw mechanism upon which the pawl swivels.

A remotely controlled servo motor, driving through suitable gears, positions a primary positioning ring to the exact rotational position relative to the temperature current at the time of announcement to position the temperature record to the correct temperature announcement track relative to the sound head. The temperature record is mounted on a hub in axial alignment with the hour and minute records. Two equally tensioned springs provide the force necessary to rotate the temperature record hub. The springs are attached to a pin which is mounted in a flange of the record hub. The pin projects through an opening in another flange of the primary positioning ring. The other ends of the two springs are mounted to two pins which are inserted in the flange of the primary positioning ring. The rotational position of the primary positioning ring and record may be such that the sound head would traverse the record spanning a portion of two sound tracks producing unintelligible sound, as would be the case, for example, if the actual temperature were at any one-half degree increment.

A null device has been incorporated to preclude such a possibility. This device consists of a roller and a flange having semi-circular detents in its periphery which is attached to a flange of the record hub. The roller is mounted on a pivoted arm which in turn is mounted on another arm attached to a cam controlled shaft. The null cam turns at twelve r.p.m. with the primary shaft. Immediately before the engagement of the aforementioned clutch pawl with the clutch pin to activate the spring drum, the null cam releases a cam follower and allows spring tension from a spring plunger to cause the engagement of the roller with the semi-circular detented flange on the record hub. The pivoted roller mounting arm is spring loaded at an angle to both the center line of the arm on which it is mounted and the center line of the detented flange. Consequently, if the exact temperature should be at a one-half degree increment the roller would contact the tip of a detent tooth and be deflected off the center line of the tooth by the continued travel of the arm thereby causing the roller to overcome the centering action of the two springs and seat itself into the detent for the next higher announcement. For example, should the exact temperature be 76½°, the announcement track for 77° would be aligned with the sound head and announced. After completion of the announcement portion of the five second cycle the roller is disengaged from the detent flange by the null cam allowing the springs to return the record assembly to its correct radial position relative to the primary positioning ring.

The sound head carriage assembly is supported by slide rods during its movement in the announcement cycle. The carriage assembly is moved by means of a spring mechanism which is mounted on the aforementioned drum. The spring has an arcuate cross-sectional shape to increase its tendency to assume its natural uncoiled shape. A roller is provided to press the spring against the spring drum while the drum is actuated to move the sound head across the records.

Accordingly, it is a feature of this invention to provide an aperiodic and periodic physical variable announcing machine wherein the records containing both the aperiodic and periodic variables are mounted on a common axis. This enables both the periodic and aperiodic variables to be announced with a common medium such as a magnetic sound head. The combined announcement of the periodic and aperiodic variables into one mechanism enables a positive continuity of announcements to be achieved. In the normal practice of utilizing separate machines for each type of announcement the continuity is not positive but is dependent upon the synchronization of the two or more units producing the announcement.

Another feature of this invention is to provide an announcing machine having axially recorded cylindrical records. This enables a number of tracks recorded on the record to be limited only by the diameter of the record as related to the width of the sound tracks recorded thereon.

It is a further feature of this invention to provide a spring drive mechanism for actuating the carriage head assembly which is designed to produce a constant force irrespective of the degree to which it is wound on its associated drum. Advantageously, the cross-sectional shape of the spring is arcuate. The natural tendency of a straight spring, when coiled, to assume its natural shape is increased by forming the cross section in this manner.

It is still a further feature of this invention to provide a device for the indexing of the hour record and hub by the actions of the hour index cam on a pawl fixed to the minute hub thereby causing the pawl to engage a tooth on the flange of the hour record hub to provide the required rotational movement.

A still further feature of this invention is to provide apparatus for securing the positive alignment of the sound head with the temperature announcement track which operates in conjunction with the remotely controlled servo motor. The servo motor drives a primary positioning ring to the exact rotational position relative to the temperature current at the time of announcement. The pin, projecting through the flange on the primary positioning ring and mounted to a flange of the record hub, causes the record hub to be rotated to its correct rotational position. Advantageously, a null device is provided whereby the record hub is prevented from being locked between two temperature announcements and is caused to be rotated into position for the next higher temperature announcement.

These various other objects and features of this invention will be more thoroughly understood from reading a detailed description in conjunction with the drawings, in which.

Figure 1:
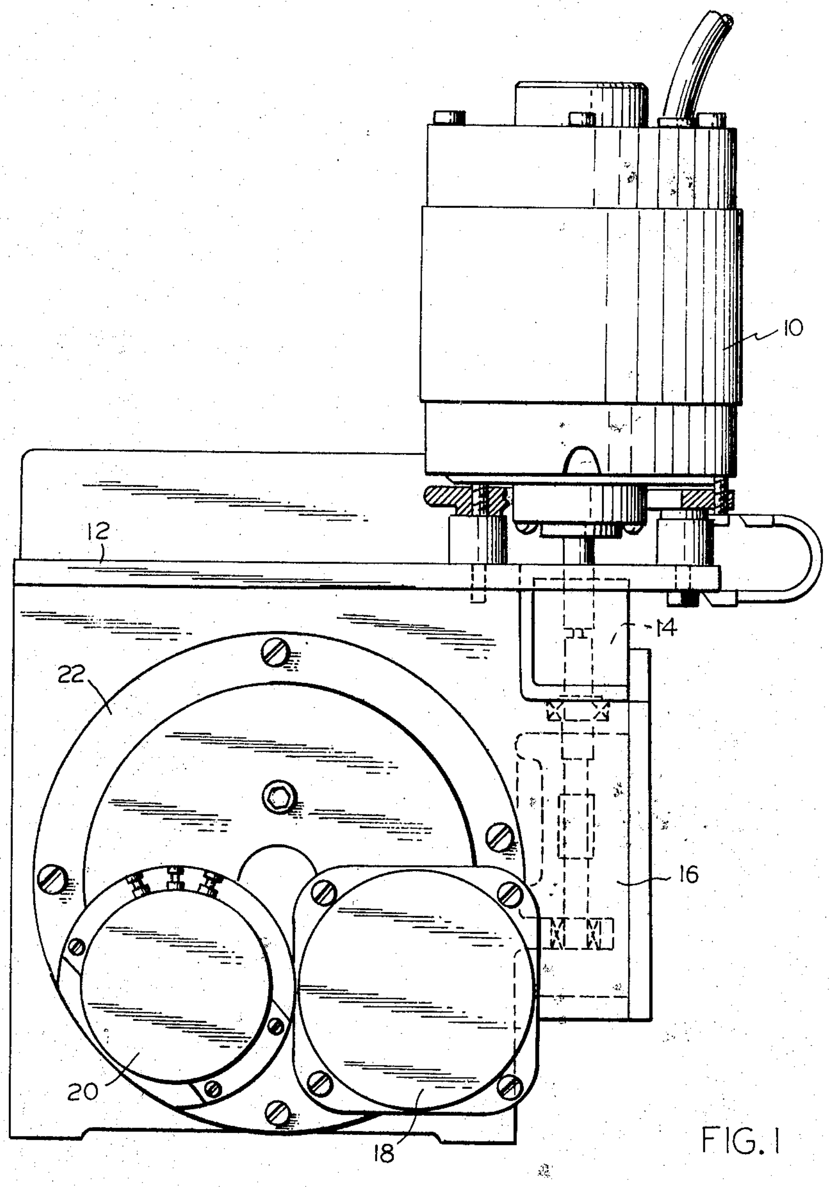
FIG. 1 is an end view in elevation, partly in section, of an illustrative embodiment of the invention.
Figure 2:
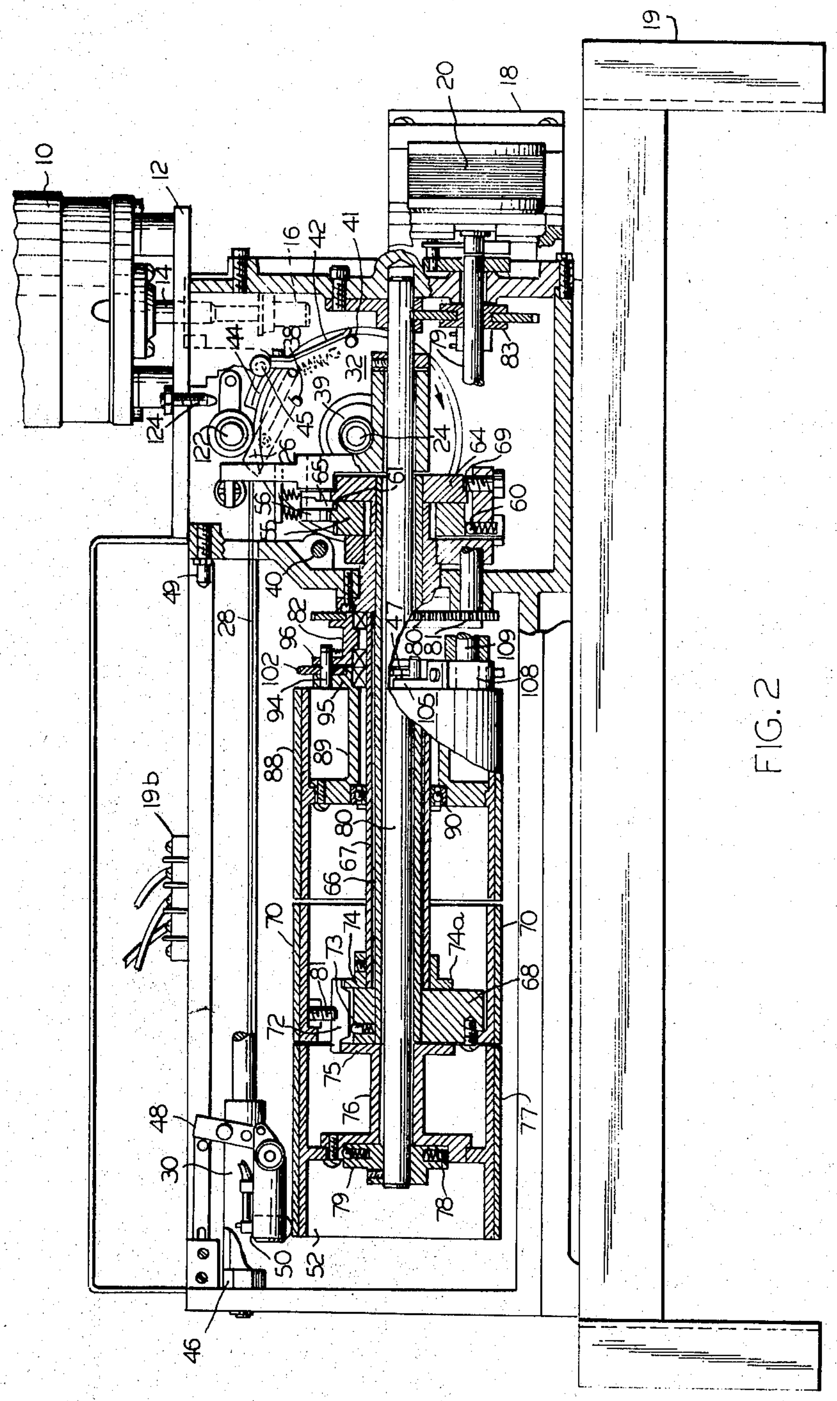
FIG. 2 is a front view, partly in section, and with certain portions removed of the embodiment shown in FIG. 1.
Figure 3:
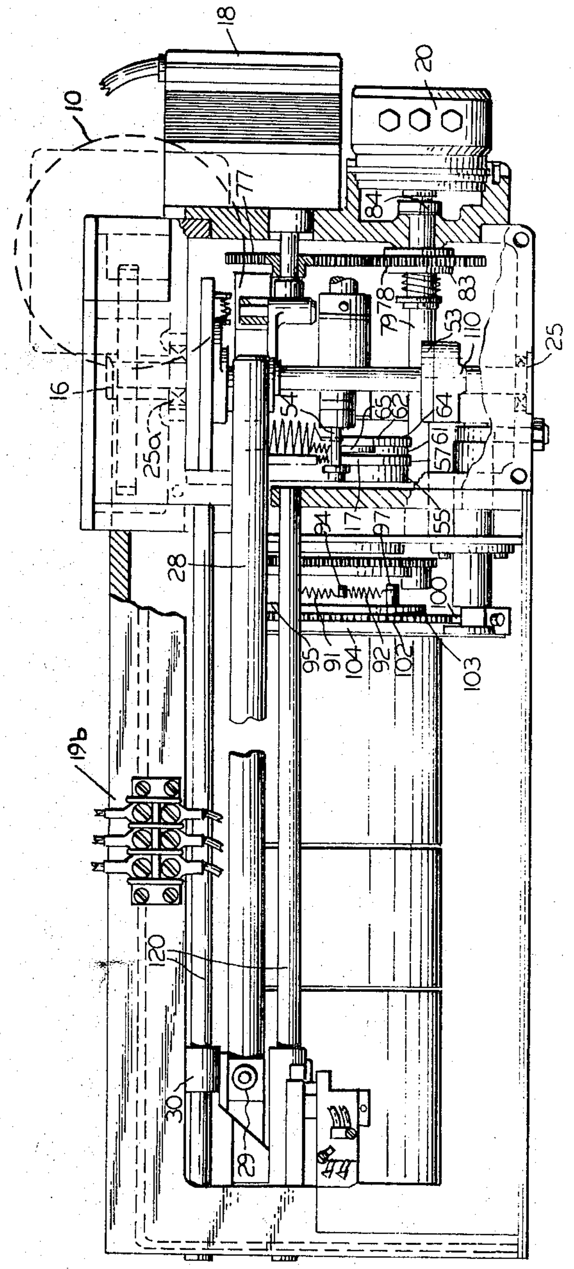
FIG. 3 is a top elevational view, partly in section, with certain portions removed to more clearly illustrate the relationship of the parts of the same embodiment.

With reference to the figures, and particularly FIGS. 1–3, synchronous motor 10 is mounted to a top portion of frame member 12 and by means of coupling 14 is connected to gear reduction assembly 16 to provide the basic timing device for the announcing machine. Servo motor 18 and potentiometer 20 control the operation of the aperiodic announcement mechanism which will be described more fully hereinafter. Servo motor 18 and potentiometer 20 are suitably mounted to end plate 22 to afford access to the mechanism within the announcing machine. Support member 19 provides a means for mounting the announcing machine.

Gear reduction assembly 16 reduces the speed of synchronous motor 10 to drive primary shaft 24 at twelve r.p.m. The rotation of primary shaft 24 at twelve r.p.m. provides the basic timing for the five second cyclic announcement periods. Primary shaft 24 is mounted to a stationary support member of the machine by bearings 25, 25*a*, (as best seen in FIG. 3) to engage gear reduction assembly 16. Tape spring 28 is secured at 29 to head carriage assembly 30 and wound on spring drum 32 such that at the end of an announcing cycle the head carriage assembly is returned to its starting position as shown in FIGS. 2 and 3. The electrical contact block and the electrical wires for connecting sound head 50 with its associated apparatus, such as an amplifying apparatus, are indicated generally as 19*a* and 19*b*, respectively.

Pawl clutch 26 is locked on primary shaft 24 to engage pin 38 which is protrudingly mounted from the side of spring drum 32 as the spring drum is rotated by the primary shaft. Spring drum 32 is mounted to shaft 24 by means of bearings 39 in a manner to allow rotational freedom of the primary shaft at the end of each announcement cycle to enable tape spring 28 to unwind and return head carriage assembly 30 to its starting position. Spring drum 32 is driven clockwise (FIG. 2) through four-fifths of a revolution and then it is released by means of pin 40 which disengages pawl 26 from pin 38. This allows spring 28 to return head carriage assembly 30 to its starting position. Pin 41 is mounted to protrude from the side of spring drum 32 to engage arm 42 of brake shoe 44 which is swivelly mounted to the frame of the machine at 45. Arm 42 is engaged by pin 41 immediately before the carriage assembly 30 reaches the end of its travel in returning to the starting position to cause brake shoe 44 to press down upon the surface of spring 28 to slow down the head carriage assembly before it strikes stop 46.

At the end of the announcement portion of the five second cycle (that is when the head carriage assembly is to the right in FIG. 2) lifter cam 48 is activated by adjustable actuator pin 49 (FIG. 2) to lift sound head 50 off the surface of the records prior to the release of spring drum 32. Thus, sound head 50 is lifted from the surface of the records while carriage assembly 30 is returning to its starting position where lifter cam 48 is again actuated to lower the sound head onto the records.

Figure 5:
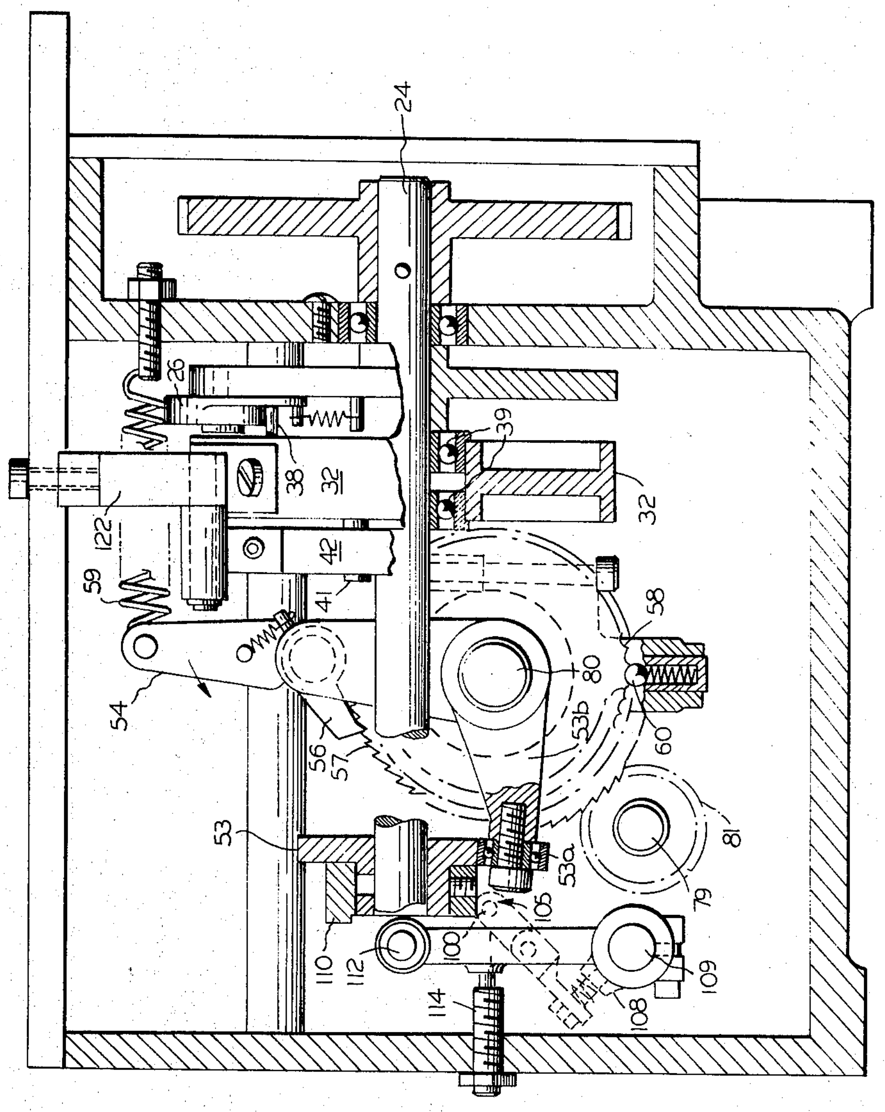
FIG. 5 is an end view, partly in section, with certain parts removed, of the same embodiment.

Cam 53, also mounted to primary shaft 24, operates ratchet lever 54 one time each five seconds, i.e. once every announcement cycle, as best seen in FIG. 5. Cam 53 engages cam follower 53*a* mounted to projection arm 53*b* after disengagement of clutch pawl 26 to cause ratchet lever 54 to rotate to the left. The counterclockwise movement of ratchet lever 54 causes ratchet pawl 56, which engages teeth 57 of primary ratchet wheel 55 (FIGS. 2 and 3) to index primary ratchet wheel 55 by one tooth for each revolution of primary shaft 24. Primary ratchet wheel 55 has sixty teeth on its periphery. Semi-circular detents 58 are machined into a projection on one side of primary ratchet wheel 55 and are engaged by spring loaded ball 60 to retain the wheel during the return movement of ratchet lever 54 which is returned by spring 59 opposedly mounted to a frame support.

Projection 61, on the side of primary ratchet wheel 55, forms a five-lobed cam to control minute index ratchet pawl 62 in its contact with minute ratchet wheel 64 as best seen in FIGS. 2 and 3. Minute index ratchet pawl 62 has projection 65 on its side which acts as a cam follower and contacts cam projection 61 of the primary ratchet wheel allowing minute ratchet pawl 62 to engage the minute ratchet wheel 64 each twelfth index of the primary ratchet wheel. Minute ratchet wheel 64 is detented by spring loaded ball 69 in the same manner as the primary ratchet wheel and is secured to tubular minute shaft 66 which extends through and is mounted by bearings in outer support member 67. Minute record hub 68 is mounted on the outer end of tubular minute shaft 66 and, in addition to functioning as a hub for minute record 70, serves as a member of the hour index mechanism.

With particular reference to FIG. 2, minute record hub 68 has a slot machined axially in its periphery to accept hour index pawl 72. Hour index pawl 72 is spring loaded by member 73 to cause one of its ends to ride the periphery of single lobed hour index cam 74. Hour index cam 74 is mounted to stationary outer support member 67. At each fifty-ninth index of the minute record, pawl 72 is deflected by cam lobe 74*a* of hour index cam 74 causing its opposite end to enter between two teeth of the sixty teeth machined in the periphery of flange 75 on hour hub 76. On the sixtieth index of minute record 70, hour record hub 76 and hour record 77 is indexed one-sixtieth of a revolution. In the succeeding minute index, pawl 72 moves off the cam lobe and disengages the teeth of hour record hub flange 75. Detents machined in a recess of the hour record hub are engaged by spring loaded balls 78 mounted in hub 79 which is secured to fixed shaft 80 to retain the index position of the hour record assembly between indexes. The engagement of pawl 72 with the teeth of hour hub flange 75 is adjustable by means of ball-pointed screw 81 upon which the pawl swivels.

Before proceeding to the description of the aperiodic announcement apparatus, it should be noted that the engagement of cam 53, resulting in the rotation of primary ratchet wheel 55 and the subsequent indexing of the minute and hour record hubs, immediately after the release of spring drum 32, insures that the minute and hour records are not in motion during the announcement portion of the announcement cycle. Such operation results in movement of the minute and hour record hubs only during the time when the carriage assembly is being returned to its starting position.

The present servo system is preferably of the same Wheatstone bridge type as described in the aforementioned patent. However, in the patented system the magnetic head was positioned with respect to the correct announcement track of the temperature record. As previously mentioned, an important feature of this invention resides in a construction wherein the recording tracks are positioned on the longitudinal axis of the record mediums and the recording head is constructed to move along the longitudinal axis of the recording medium to provide the desired announcements. Thus the servo system of the instant invention is modified from that which is disclosed in the aforementioned patent (at columns 5 and 6 thereof) to the extent that instead of positioning the magnetic head relative to the correct announcement track, it positions the temperature record, or more particularly the temperature announcement track thereof, relative to the reproducing head.

In the bridge type servo system used with this invention, it is necessary to mechanically connect the temperature record hub, or an aligned member, to an electrical contact of a variable resistance. The variable resistance is connected in one branch of the bridge opposite the servo motor which controls the position of the temperature record. In the continuous balance system a resistance bulb is connected in one arm of the Wheatstone bridge circuit and the balancing unit, including the servo motor, is connected in the diagonal arm of the Wheatstone bridge. The servo motor is mechanically connected to a contacter which controls the resistance of the branch opposite the resistance bulb. The control resistance may preferably be a potentiometer in the form of a pair of parallel-connected and parallel-positioned resistance wires. Any variation in the resistance of the resistance bulb in response to changes in temperature will cause a current to flow through the balance unit and will be amplified and transmited to the servo motor. The motor, in response to this E.M.F. drives the pair of contacts which engages the parallel-connected potentiometers of the calibrated E.M.F. until the system is re-balanced.

With reference to FIG. 2, servo motor 18 drives primary positioning ring 82 through gears 77, 78, shaft 79, gears 80, 81, to the exact rotational position relative to the temperature current at the time of announcement. Servo motor 18 is coupled to shaft 79 by means of slip clutch 83 and potentiometer 20 is rotated by coupling 84 which connects with shaft 79.

Temperature record 88 is mounted on hub 89 and is supported by outer support member 67 on bearings 90. Record hub 89 is rotated by means of springs 91, 92 of equal tension mounted to pin 94 which is in turn secured in flange 95 of record hub 89. Pin 94 projects through an opening in flange 96 of primary positioning ring 82. The ends of springs 91, 92 are respectively attached to pins 97 (only one of which is shown in FIG. 3 for clarity) inserted in flange 95 of the primary positioning ring. Rotation of primary positioning ring 82 will thereby cause rotation of record hub 89 by means of springs 91, 92 being connected to pins 97 in flange 96, and pin 94 in flange 95. The hole in flange 96 through which pin 94 extends is sufficiently larger than pin 94 to allow null roller 100 to overcome centering action of springs 91 and 92. The hole also acts to prevent excess stress being applied to springs 91 and 92 by manually turning the record assembly.

Figure 4:
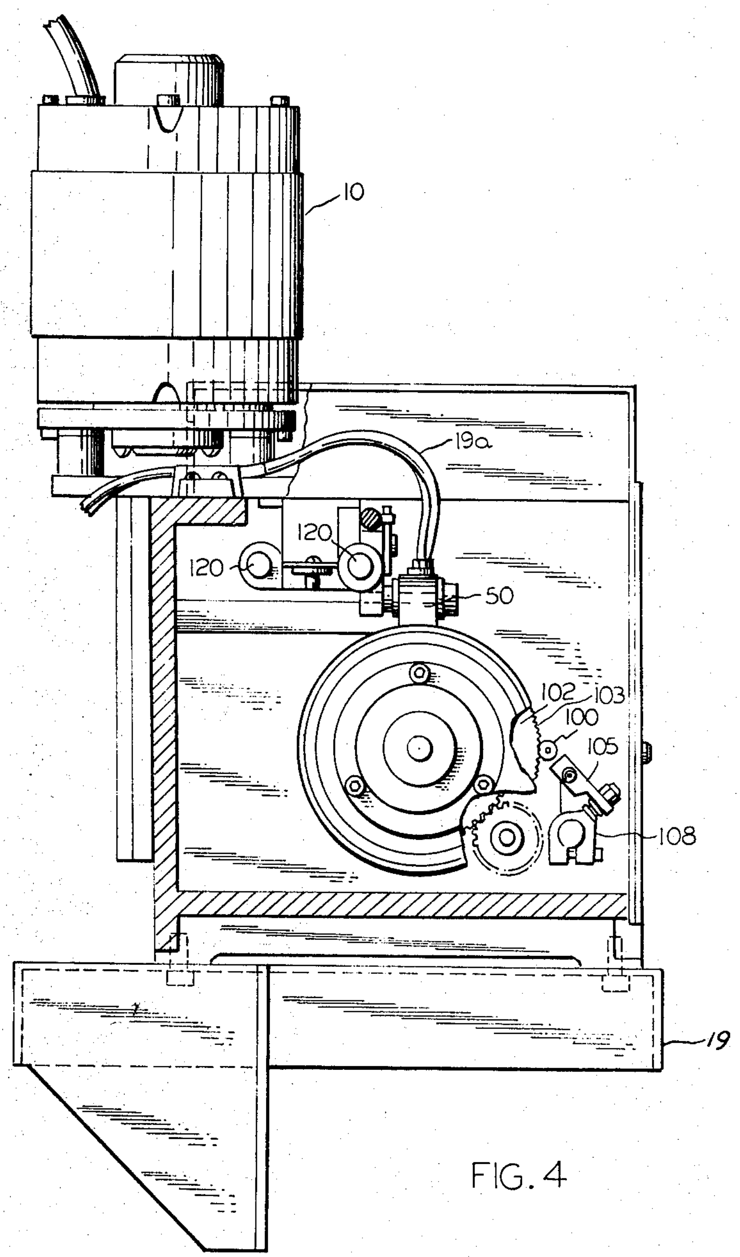
FIG. 4 is a side elevational view, partly in section, with certain parts removed, of the same embodiment.

In operation, the rotational position of the primary positioning ring and the temperature record would be such that the sound head would traverse the record spanning a portion of two sound tracks thereby producing unintelligible sound. For example, if the exact current temperature were at any one-half degree increment the record may be positioned such that the sound head would traverse a portion of each of the sound tracks containing the 76° and 77° temperature announcements. To preclude this possibility, a null mechanism is incorporated in the announcing machine. This null mechanism is best seen as illustrated in FIGS. 4 and 5. The null device, comprising roller 100 and flange 102, having semi-circular detents 103 in its periphery, is mounted to flange 104 of temperature record hub 89. Roller 100 is mounted on pivot arm 105 which in turn is mounted on rotatable arm 108 attached to cam controlled shaft 109. Null cam 110 rotates at twelve r.p.m. with shaft 24.

Immediately before the engagement of clutch pawl 26 with clutch pin 38, null cam 110 releases cam follower 112 and allows spring tension from spring plunger 114 to cause the engagement of roller 100 with flange 102 on temperature record hub 89. Roller mounting arm 105 is spring loaded at an angle to both the center line of rotatable arm 108 and the center line of detented flange 102. Consequently, if the exact temperature should be at a one-half degree increment, for example, roller 100 would contact the tip of a detent tooth 103 and be deflected off the center line of the tooth by the continued travel of rotatable arm 108. This will cause roller 100 to overcome the centering action of springs 91, 92 and seat itself into the detent for the next higher announcement. For example, should the exact temperature be 76½° (as indicated by the servo control mechanism), the announcement track for 77° would be aligned with the sound head and announced. After completion of the announcement portion of the cycle, roller 100 is disengaged from detent flange 102 by cam 110 allowing springs 91, 92 to return the record assembly to its correct radial position relative to primary positioning ring 82.

Sound head carriage assembly 30 is supported by slide rods 120 for parallel movement of sound head 50 over the surfaces of the records during an announcement cycle. Roller 122 is pressed against the surface of spring 28 by spring loaded pin 124 to flatten the spring against spring drum 32 as the drum is actuated by primary shaft 24 to move sound head 50 across the records.

Tape spring 28 is designed to produce a constant force irrespective of the degree to which it is wound on the associated drum. Spring 28 is utilized as a constant force compression spring to exert a tangential force to spring drum 32 on which it is wound. In operation, the rotation of spring drum 32 by primary shaft 24 causes tape spring 28 to wind on the drum, and sound head 50, which is fastened to the end of spring 28, is caused to move across the surface of the axially positioned record drums. At the end of an announcement cycle the operation of the hereinbefore described pawl clutch 26 releases the spring drum from the primary shaft and the tangential force provided by spring 28 is used to return sound head 50 to its starting position in preparation for the next announcement cycle. Spring 28 may have a cross-sectional shape different from the preferred arcuate shape and may be varied to increase its stiffness by giving it an undulated or other shape of greater or lesser degree dependent upon the amount of stiffness required to perform its intended function. The purpose of providing a spring having the above suggested cross-sectional shape is that the natural tendency of a straight spring, when coiled, to assume its natural shape is thereby increased.

While an embodiment of the invention has been shown and described for the purposes of illustrating its intended operation, it is understood that the principles thereof may be modified or varied to include other forms and adaptations of the apparatus. For example, the announcements need not be confined to a combination of time and temperature, but other periodic and aperiodic variables may be recorded on the longitudinal axis of the records. Furthermore, the announcement apparatus disclosed herein may be suitably modified so as to announce only periodic records, or only aperiodic records. The reproducing medium need not be confined to a magnetic reproducing head for reproducing the human voice, but may be adapted to include digital and other types of coded information as well. In such instances the reproducer output may be connected to the input of a digital computer or even a transmitting device.

The means for preventing the servo motor from moving the aperiodic storage member during the scanning of the reproducing element across the storage members is accomplished by the action of roller 100 on tooth 103. However, for additional reliability a detent as disclosed in the aforementioned McCarty patent could be added operating from shaft 109 to lock shaft 79, thereby preventing rotation of the storage means.

Although preferred embodiments of the invention have been described in such detail as to facilitate reproduction by those skilled in the art, such description is to be considered illustrative rather than limiting for the invention may be altered by the substitution of other components than those described herein without departing from its fundamental concepts and the spirit of the subject invention.

What I claim is:

1. Apparatus for selecting and reproducing stored information, comprising;

storage means for the retention of physical data, the storage means including recording tracks extending along the longitudinal axis of the storage means, reproducing means for scanning the recording tracks, drive means for moving the reproducing means along the longitudinal axis of the storage means to scan the recording tracks, control means for positioning the recording tracks with respect to the reproducing means to reproduce selected information from the storage means, a housing, synchronous power means mounted to the housing for providing a timing reference drive for the drive means and the control means, the drive means including primary shaft means driven by the synchronous power means, the drive means further including drum means rotatably mounted on the primary shaft means, the drive means further including clutch means mounted on the primary shaft engaging the drum to cause the drum to rotate with the primary shaft and move the reproducing means for scanning the recording tracks, means mounted on the housing to disengage the clutch means from the drum, and the drum means including return means connected to the reproducing means, the return means providing a force tangential to the drum means to return the reproducing means to an initial position when the clutch means is disengaged from the drum.

2. Apparatus according to claim 1 wherein the return means is a straight spring attached to the drum means whereby the spring is wound on the drum means during the scanning of the records by the reproducing means, the spring providing the force tangential to the drum to return the reproducing means to the initial position, and the drum means further including brake means mounted to the housing to engage the spring only during the return of the reproducing means.

3. Apparatus according to claim 2 wherein the spring means has an arcuate cross-sectional shape to increase the torque developed by the spring means, and the drum means further including roller means mounted on the housing to press the spring onto the drum surface, such force being required to maintain friction between the spring and the drum.

4. Apparatus according to claim 1 wherein the storage means includes at least one storage member for storing information representative of aperiodic physical data and the storage members are aligned along a common longitudinal axis, and further comprising a servo system for controlling the aperiodic storage member in response to changes in the aperiodic physical data sensed by the servo system, the servo system including a servo motor, primary positioning means driven by the servo motor to positions representative of the changes in the aperiodic variable, and means interconnecting the aperiodic storage member with the primary positioning means whereby the individual recording track containing recorded information representing the status of the aperiodic data is aligned with the longitudinal axis of the reproducing means.

5. Apparatus according to claim 4 wherein the aperiodic storage member is rotatably mounted in the housing and includes balanced resilient means mounted to the housing whereby rotation of the aperiodic storage member by the primary positioning means causes opposing equal torques to be applied to the storage member to normally position the aperiodic storage member in exact relationship to the aperiodic variable to be announced.

6. Apparatus according to claim 4 further comprising null means for positioning a selected recording track in positive alignment with the lognitudinal axis of the reproducing means, the null means including first means engaging the primary shaft immediately prior to the engagement of the clutch means with the drum means, and second means operated by the first means and engaging the aperiodic storage member to position a selected track thereof in alignment with the reproducing means.

7. Apparatus according to claim 6 wherein the first means includes cam means mounted on the primary shaft and roller means engaged by the cam means for each revolution of the primary shaft, the second means including a null cam shaft rotatably mounted in the housing to be engaged and activated by the roler means, second roller means mounted to the null cam shaft, and wherein the aperiodic storage member includes a flange having detents whereby activation of the null cam shaft causes the second roller means to engage one of the detents to positively align the aperiodic recording track with the longitudinal axis of the reproducing means.

8. Apparatus according to claim 6 wherein the aperiodic storage member is rotatably mounted in the housing and includes balanced resilient means mounted to the housing whereby rotation of the storage member by the primary positioning means causes opposing equal torques to be overcome by the action of the null means to center the second roller means in a detent of the storage member.

9. Apparatus according to claim 8 wherein the first means includes cam means mounted on the primary shaft and roller means engaged by the cam means for each revolution of the primary shaft, the second means including a null cam shaft rotatably mounted in the housing to be engaged and activated by the roller means, second roller means mounted to the null cam shaft, and wherein the aperiodic storage member includes a flange having detents whereby activation of the null cam shaft causes the second roller means to engage one of the detents to positively align the aperiodic recording track with the longitudinal axis of the reproducing means.

10. Apparatus for selecting and reproducing stored information, comprising:

storage means for the retention of physical data, the storage means including recording tracks extending along the longitudinal axis of the storage means, reproducing means for scanning the recording tracks, drive means for moving the reproducing means along the longitudinal axis of the storage means to scan the recording tracks, control means for positioning the recording tracks with respect to the reproducing means to reproduce selected information from the storage means, a housing, synchronous power means mounted to the housing for providing a timing reference drive source for the drive means and the control means, and wherein the drive means includes primary shaft means driven by the synchronous power means to establish a basic timing cycle, the storage means includes several mutually dependent storage members for storing information representative of periodic physical data, the control means includes indexing means for repetitively positioning the mutually dependent storage members with respect to the periodic physical data, the indexing means including means responsive to the basic timing cycle for positioning at least one dependent storage member in accordance with the basic timing cycle, and the indexing means further including means interconnecting the at least one dependent storage member with at least one other dependent storage member whereby the other dependent storage member is positioned in accordance with a sub-multiple of the basic timing cycle.

11. Apparatus according to claim 10 wherein the means responsive to the basic timing cycle includes a primary reference member and a secondary reference member, the primary reference member is positioned by each revolution of the primary shaft, the secondary reference member including means engaging the primary reference member whereby the secondary reference member is positioned in accordance with a selected ratio of the primary reference member, the means interconnecting the dependent storage members including reciprocating means, the dependent storage members each including means for engaging the reciprocating means, and the means for interconnecting the dependent storage members including stationary means engaging the reciprocating means to cause the dependent storage members to be positioned with respect to one another in a selected ratio.

12. Apparatus according to claim 11 wherein the primary reference member, the secondary reference member and at least one of the dependent storage members includes detent means for retaining the respective member in a fixed position between indexing operations.

13. Apparatus according to claim 10 wherein the storage means includes at least one storage member for storing information representative of aperiodic physical data and the storage members are aligned along a common longitudinal axis, and further comprising a servo system for controlling the aperiodic storage member in response to changes in the aperiodic physical data sensed by the servo system, the servo system including a servo motor, primary positioning means driven by the servo motor to positions representative of the changes in the aperiodic variable, and means interconnecting the aperiodic storage member with the primary positioning means whereby the individual recording track containing information representing the status of the aperiodic data is aligned with the longitudinal axis of the reproducing means.

14. Apparatus according to claim 13 wherein the drive means further includes drum means rotatably mounted on the primary shaft means, the drive means further including clutch means mounted on the primary shaft engaging the drum means to cause the drum to rotate with the primary shaft and move the reproducing means for scanning the recording tracks, means mounted on the housing to disengage the clutch means from the drum, the drum means including return means connected to the reproducing means, the return means providing a force tangential to the drum means to return the reproducing means to an initial position when the clutch means is disengaged from the drum, null means for positioning a selected recording track in positive alignment with the longitudinal axis of the reproducing means, the null means including first means engaging the primary shaft immediately prior to the engagement of the clutch means with the drum means, and second means operated by the first means and engaging the aperiodic storage member to position a selected track thereof in alignment with the reproducing means.

15. Apparatus according to claim 14 wherein the means responsive to the basic timing cycle includes a primary reference member and a secondary reference member, the primary reference member is positioned each revolution of the primary shaft, the secondary reference member including means engaging the primary reference member whereby the secondary reference member is positioned in accordance with a selected ratio of the primary reference member, the means interconnecting the depending storage members including reciprocating means, the dependent storage members each including means for engaging the reciprocating means, and the means interconnecting the dependent storage members further including stationary means engaging the reciprocating means to cause the dependent storage members to be positioned with respect to one another in a selected ratio.

16. Apparatus according to claim 14 wherein the aperiodic storage member is rotatably mounted in the housing and includes balanced resilient means mounted to the housing whereby rotation of the storage member by the primary positioning means causes opposing equal torques to be exerted on the storage member by the balanced resilient means to center the aperiodic storage member in exact relationship to the quantitative status of the aperiodic variable to be announced, the first means includes cam means mounted on the primary shaft and roller means engaged by the cam means for each revolution of the primary shaft, the second means including a null cam shaft rotatably mounted in the housing to be engaged and actived by the roller means, second roller means mounted to the null cam shaft, and the aperiodic storage member includes a flange having detents whereby activation of the null cam shaft causes the second rollers means to engage one of the detents to positively align the aperiodic recording track with the longitudinal axis of the reproducing means.

17. Apparatus according to claim 16 wherein the means responsive to the basic timing cycle includes a primary reference member and a secondary reference member, the primary reference member is positioned each revolution of the primary shaft, the secondary reference member including means engaging the primary reference member whereby the secondary reference member is positioned in accordance with a selected ratio of the primary reference member, the means interconnecting the depending storage members including reciprocating means, the dependent storage members each including means for engaging the reciprocating means, and the means interconnecting the dependent storage members further including stationary means engaging the reciprocating means to cause the dependent storage means to be positioned with respect to one another in a selected ratio.

References Cited

UNITED STATES PATENTS

| | | | |
|---|---|---|---|
| 2,973,967 | 3/1961 | Freeman | 274—20 |
| 3,275,328 | 9/1966 | Varga | 274—4 |
| 2,862,065 | 11/1958 | Franklin | 179—6.1 |
| 2,831,927 | 4/1958 | McCarty | 179—100.1 |

FOREIGN PATENTS

| | | |
|---|---|---|
| 970,424 | 9/1958 | Germany. |

TERRELL W. FEARS, Primary Examiner

J. ROSENBLATT, Assistant Examiner

U.S. Cl. X.R.

179—100.2